(12) United States Patent
Baumgarte

(10) Patent No.: US 11,501,789 B2
(45) Date of Patent: *Nov. 15, 2022

(54) ENCODED AUDIO METADATA-BASED EQUALIZATION

(71) Applicant: Apple Inc., Cupertino, CA (US)

(72) Inventor: Frank Baumgarte, Sunnyvale, CA (US)

(73) Assignee: APPLE INC., Cupertino, CA (US)

( * ) Notice: Subject to any disclaimer, the term of this patent is extended or adjusted under 35 U.S.C. 154(b) by 78 days.

This patent is subject to a terminal disclaimer.

(21) Appl. No.: 16/893,114

(22) Filed: Jun. 4, 2020

(65) Prior Publication Data
US 2020/0342886 A1 Oct. 29, 2020

Related U.S. Application Data

(63) Continuation of application No. 15/940,912, filed on Mar. 29, 2018, now Pat. No. 10,699,726, which is a (Continued)

(51) Int. Cl.
*G10L 19/26* (2013.01)
*G10L 19/008* (2013.01)
(Continued)

(52) U.S. Cl.
CPC ............ *G10L 19/26* (2013.01); *G10L 19/008* (2013.01); *G10L 19/167* (2013.01);
(Continued)

(58) Field of Classification Search
CPC ............ H04S 2400/03; H04S 2420/01; H04S 2400/13; H04S 2400/01; H04S 7/30;
(Continued)

(56) References Cited

U.S. PATENT DOCUMENTS 8,908,874 B2 * 12/2014 Johnston ................. G10K 15/08
381/23
10,699,726 B2 * 6/2020 Baumgarte ............. H04S 7/307
(Continued)

FOREIGN PATENT DOCUMENTS

CN 1283298 2/2001
CN 103270508 8/2013
(Continued)

OTHER PUBLICATIONS

Office Action and Search Report for Chinese Application No. 202010311316.8 dated Mar. 3, 2021, 26 pages.
(Continued)

*Primary Examiner* — Lun-See Lao
(74) *Attorney, Agent, or Firm* — Womble Bond Dickinson (US) LLP

(57) ABSTRACT

A system for producing an encoded digital audio recording has an audio encoder that encodes a digital audio recording having a number of audio channels or audio objects. An equalization (EQ) value generator produces a sequence of EQ values which define EQ filtering that is to be applied when decoding the encoded digital audio recording, wherein the EQ filtering is to be applied to a group of one or more of the audio channels or audio objects of the recording independent of any downmix. A bitstream multiplexer combines the encoded digital audio recording with the sequence of EQ values, the latter as metadata associated with the encoded digital audio recording. Other embodiments are also described including a system for decoding the encoded audio recording.

23 Claims, 3 Drawing Sheets

Related U.S. Application Data continuation of application No. 15/060,392, filed on Mar. 3, 2016, now Pat. No. 9,934,790.

(60) Provisional application No. 62/199,634, filed on Jul. 31, 2015.

(51) Int. Cl.
| | | |
|---|---|---|
| *G10L 19/16* | (2013.01) | |
| *H04S 7/00* | (2006.01) | |
| *G11B 27/031* | (2006.01) | |
| *G11B 27/32* | (2006.01) | |
| *H04S 3/00* | (2006.01) | |

(52) U.S. Cl.
CPC .......... *G11B 27/031* (2013.01); *G11B 27/322* (2013.01); *H04S 3/006* (2013.01); *H04S 3/008* (2013.01); *H04S 7/307* (2013.01); *H04S 2400/03* (2013.01); *H04S 2400/13* (2013.01); *H04S 2400/15* (2013.01)

(58) Field of Classification Search
CPC .......... H04S 7/307; H04S 3/008; H04S 7/301; H04S 2420/03; H04S 7/305; H04S 2400/15; H04S 3/006; H04S 2400/11; H04S 3/02; H04S 7/304; H04S 1/007; H04S 3/004; H04S 7/306; H04S 5/005; H04S 7/302; H04S 3/002; H04S 7/303; H04S 7/308; H04S 2420/07; H04S 1/002; G10L 19/008; G10L 19/167; G10L 19/26; G10L 19/018; G10L 19/22; G10L 21/0316; G10L 25/06; G10L 19/005; G10L 19/0204; G10L 21/04; G10L 21/0324; H04R 5/02; H04R 5/04; H04R 2205/022; H04R 2227/003; H04R 27/00; H04R 2205/024; H04R 1/40; H04R 1/403
USPC ........................ 381/18–23, 104–107; 700/94
See application file for complete search history.

(56) References Cited

U.S. PATENT DOCUMENTS

| | | | |
|---|---|---|---|
| 2008/0285775 A1* | 11/2008 | Christoph | ............... H04S 7/301 381/103 |
| 2010/0014692 A1* | 1/2010 | Schreiner | ................ H04S 3/008 381/119 |
| 2016/0104491 A1 | 4/2016 | Lee et al. | |
| 2016/0240204 A1* | 8/2016 | Kuech | ...................... G06F 3/165 |
| 2016/0266865 A1* | 9/2016 | Tsingos | ................... G06F 3/165 |

FOREIGN PATENT DOCUMENTS

| | | |
|---|---|---|
| CN | 103582913 | 2/2014 |
| CN | 103650539 | 3/2014 |
| WO | 2014175669 | 10/2014 |
| WO | 2015066062 | 5/2015 |

OTHER PUBLICATIONS

Article 94(3) EPC for European Application No. 16736304.3 dated May 18, 2021, 6 pages.

* cited by examiner

ENCODED AUDIO METADATA-BASED EQUALIZATION

This application is a continuation of a U.S. application Ser. No. 15/940,912 filed Mar. 29, 2018, which is a continuation of U.S. application Ser. No. 15/060,392, filed Mar. 3, 2016, now U.S. Pat. No. 9,934,790, which claims the benefit of provisional U.S. Application No. 62/199,634 filed Jul. 31, 2015.

FIELD

An embodiment of the invention pertains generally to the encoding and decoding of an audio signal, and the use of metadata, associated with the encoded signal, during playback of the decoded signal, to improve quality of playback in various types of consumer electronics end user devices. Other embodiments are also described.

BACKGROUND

Digital audio content appears in many instances, including for example music and movie files. In most instances, an audio signal is encoded, where the encoding need not necessarily be for purposes of data-rate reduction but could simply be for purposes of format conversion, to enable the storage or transmission of a resulting media file or stream, thereby allowing numerous deliveries or transmissions to occur simultaneously (if needed). The media file or stream can be received in different types of end user devices, where the encoded audio signal is decoded before being presented to the consumer through either built-in or detachable speakers. This has helped fuel consumers' appetite for obtaining digital media over the Internet. Creators and distributors of digital audio content (programs) have several industry standards at their disposal, which can be used for encoding and decoding audio content. These include Digital Audio Compression Standard (AC-3, E-AC-3), Revision B, Document A/52B, 14 Jun. 2005 published by the Advanced Television Systems Committee, Inc. (the "ATSC Standard"), European Telecommunication Standards Institute, ETSI TS 101 154 Digital Video Broadcasting (DVB) based on MPEG-2 Transport Stream in ISO/IEC 13818-7, Advanced Audio Coding (AAC) ("MPEG-2 AAC Standard"), and ISO/IEC 14496-3 ("MPEG-4 Audio"), published by the International Standards Organization (ISO).

Audio content may be decoded and then processed (rendered) differently than it was originally mastered. For example, a mastering engineer could record an orchestra or a concert such that upon playback it would sound (to a listener) as if the listener were sitting in the audience of the concert, i.e. in front of the band or orchestra, with the applause being heard from behind. The mastering engineer could alternatively make a different rendering (of the same concert), so that, for example upon playback the listener would hear the concert as if he were on stage (where he would hear the instruments "around him", and the applause "in front"). This is also referred to as creating a different perspective for the listener in the playback room, or rendering the audio content for a different "listening location" or different playback room.

Audio content may also be rendered for different acoustic environments, e.g. playback through a headset, a smartphone speakerphone, or the built-in speakers of a tablet computer, a laptop computer, or a desktop computer. In particular, object based audio playback techniques are now available where an individual digital audio object, which is a digital audio recording of, e.g. a single person talking, an explosion, applause, or background sounds, can be played back differently over any one or more speaker channels in a given acoustic environment.

However, tonal balance as heard by a listener is affected when a previously mixed recording (of certain audio content) is then rendered into a different acoustic environment, or rendered from a different listener perspective. To alleviate such tonal imbalance, mastering engineers apply equalization (EQ) or spectral shaping to a digital audio signal, in order to optimize the audio signal for a particular acoustic environment or for a particular listener perspective. For example, rendering a motion picture file for playback in a large movie theater may call for certain EQ to be applied (to the digital audio tracks of the motion picture file) to prevent the resulting sound from being too bright during playback. But rendering the file for playback through a home theater system, e.g. as a DVD file or an Internet streaming movie file, calls for a different EQ because of the smaller room size (and other factors).

SUMMARY

In mixing and mastering or production of audio, it is common to apply two basic tools, dynamic range control or compression (DRC) and equalization (EQ), to achieve a desired level (e.g., loudness) and tonal balance. However, the consumer centered playback scenario is an unknown during production. An embodiment of the invention is a production or distribution system (e.g., a server system) that produces EQ values which are part of metadata of an encoded, digital audio content (or audio recording) file. The EQ values may define linear filtering (spectral shaping) that is to be applied to the decoded original audio recording, during playback. This application of EQ may be defined to be independent of any downmix. The spectral shaping is applied after an audio recording has been extracted by a decoder from the encoded content file; this may take place prior to a specified downmix being formed, after the downmix has been performed, or both prior to and after the downmix. The linear filtering defined by the metadata-based EQ values is designed to adjust the balance between frequency components within the audio recording, strengthening or weakening the energy of specific frequency bands, in order to better suit a particular playback acoustic environment or listening perspective. Accordingly, this enables the playback of spectrally adjusted or linear filtered audio content, where the filtering was specified at the encoding stage and intended to improve playback sound in a particular acoustical environment (e.g., a living room which is smaller than public movie theater) or for a particular sound rendering system (e.g., having a particular audio amplifier gain and speaker sensitivity). The audio content file may be for example a moving picture file, e.g. an MPEG movie file, an audio-only file, e.g. an AAC file, or a file having any suitable multimedia format. For instance, the metadata associated with the encoded digital audio recording may be carried in a number of extension fields of MPEG-D DRC. A metadata-based approach enables a unified sound program content distribution format because only a single, base version of the audio recording is needed, with the ability to deliver multiple rendered versions of the base version for different playback scenarios (as supported by the EQ sequences in the metadata.)

Various formats are possible for storing or carrying the EQ values within the metadata of an audio content file. For example, the metadata may be defined to contain one or more sequences of EQ values. See the table below for example portions of an EQ sequence. Each element of a sequence may contain a value that defines some aspect of a spectral shaping (filtering) operation that is to be performed upon a particular decoded channel or object. The EQ values have been selected for a particular rendering of the encoded digital audio content. A sequence of EQ values may define equalization filtering that is to be applied to the entirety of a piece of sound program content (in the decoded audio recording). Each EQ sequence in the metadata of a given file (referring to the same audio content in the file), may include the instructions for filtering a respective group of one or more channels or objects. An EQ set (of one or more EQ sequences) may define the EQ filtering that is applied during playback of a song through a headset, while another EQ set may define the EQ filtering that is to be applied for playback of the same song through a speaker dock. The filtering defined in a given EQ sequence is thus associated with an EQ group of one or more of the original audio channels or audio objects, and may be independent of any downmix that is to also be applied to the channels or objects of that EQ group.

The EQ values (or EQ instructions or payload) may define filtering that is to be applied in the frequency (or sub-band) domain. For example, an EQ payload may have gain values for two or more predefined frequency bands, similar to a graphic equalizer setting, e.g. treble, mid, and bass. In that case, the EQ filtering operation may multiply a frequency domain representation of the decoded audio content by the gain values. The EQ payload may alternatively, or in addition, define filtering that is to be applied in the time domain. For example, the EQ payload may contain the tap coefficients of a digital filter. In that case, an adaptive or variable digital filter may be synthesized (in the decoder stage) through which the decoded audio content is passing during playback, through the filter, in accordance with the EQ payload. In that case, the EQ filtering operation may be to pass a time domain representation of the audio content through the synthesized digital filter, as the latter is being updated during playback.

As suggested above, the application of EQ filtering may change during playback, for example as often as every frame of the audio content. But the EQ may also be designed to change at a higher layer. For example, when an audio object comes into a scene, the EQ that is applied to select audio channels may need to change, so as to better accommodate the sound of the audio object. The sequence format may therefore allow the metadata-embedded EQ values to change over time, in synch with the encoded audio content. Techniques are also described here (for the EQ metadata) that may enable for example a new EQ to fade in and an old EQ to fade out, or abrupt switching on or off of EQ (during playback).

The above summary does not include an exhaustive list of all aspects of the present invention. It is contemplated that the invention includes all systems and methods that can be practiced from all suitable combinations of the various aspects summarized above, as well as those disclosed in the Detailed Description below and particularly pointed out in the claims filed with the application. Such combinations have particular advantages not specifically recited in the above summary.

BRIEF DESCRIPTION OF THE DRAWINGS

The embodiments of the invention are illustrated by way of example and not by way of limitation in the figures of the accompanying drawings in which like references indicate similar elements. It should be noted that references to "an" or "one" embodiment of the invention in this disclosure are not necessarily to the same embodiment, and they mean at least one. Also, in the interest of conciseness and reducing the total number of figures, a given figure may be used to illustrate the features of more than one embodiment of the invention, and not all elements in the figure may be required for a given embodiment.

DETAILED DESCRIPTION

Several embodiments are described with reference to the appended drawings. While numerous details are set forth, it is understood that some embodiments of the invention may be practiced without these details. In other instances, well-known circuits, structures, and techniques have not been shown in detail so as not to obscure the understanding of this description.

Figure 1:
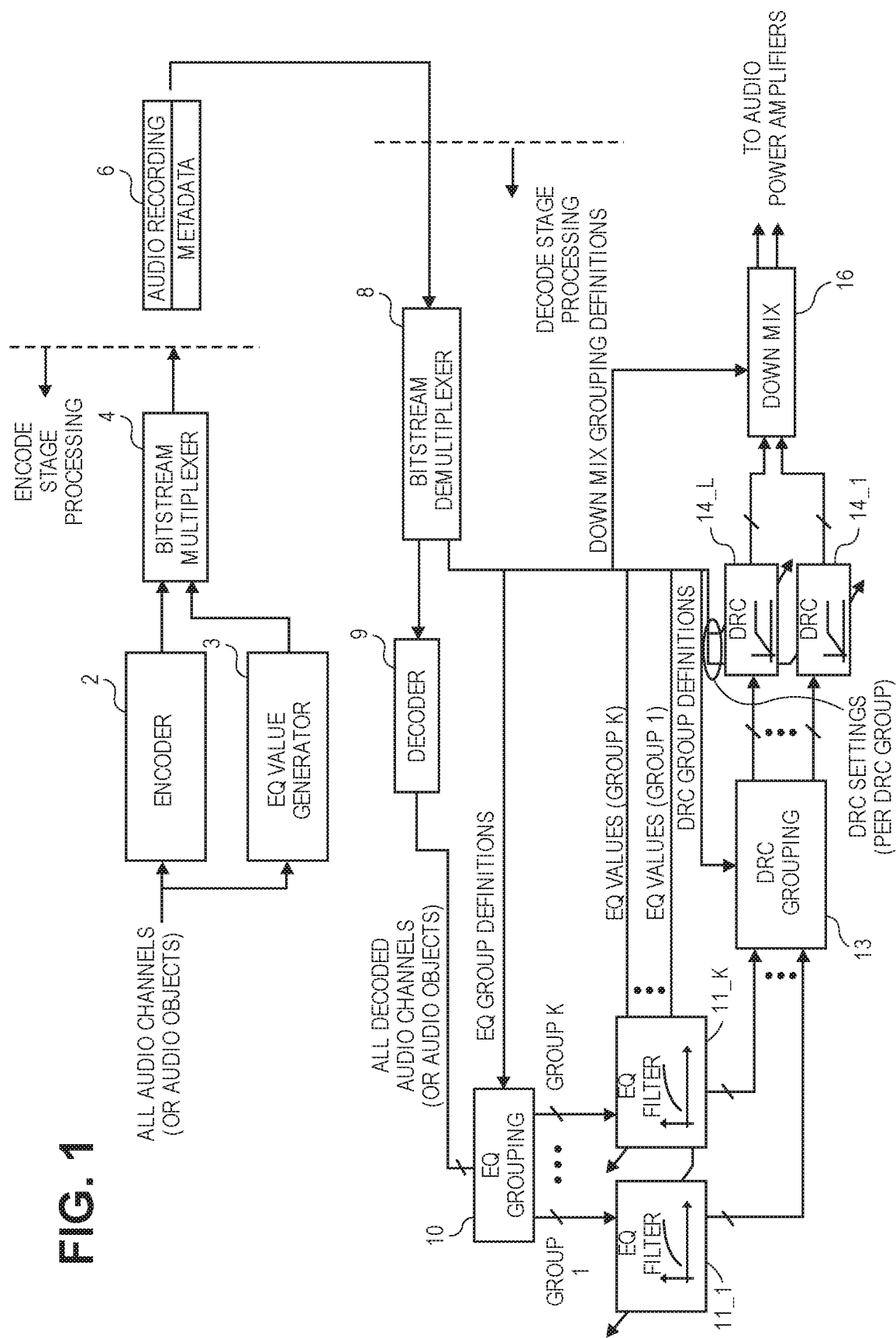
FIG. 1 is a block diagram, which shows the components that make up an example computer system that performs encode stage processing and a computer system that performs decode stage processing.

FIG. 1 shows an example of the components that make up a computer system that performs encode stage processing, and a computer system that performs decode stage processing, of a digital audio recording. It should be understood that while FIG. 1 shows an example processing chain (at the decode or playback stage) that includes EQ, dynamic range control (DRC), and downmix blocks, not all of these are required to be present in a given embodiment of the invention or in a given instance of a playback device. Also, the metadata of a particular audio content file may specify EQ for playback, but not DRC and not downmix.

The original audio recording in FIG. 1 may be in the form of a bitstream or file (where these terms are used interchangeably here), of a piece of sound program content, such as a musical work or an audio-visual work, e.g., a movie, that has a number of audio channels; alternatively, or in addition to the audio channels, the recording may include a number of audio objects, e.g., the sound program content of individual musical instruments, vocals, sound effects. The encode stage processing may be performed by, for example, a computer (or computer network) of a sound program content producer or distributor, such as a producer of musical performances or movies; the decode stage processing may be performed by, for example, a computer (or computer network) of a consumer.

Beginning with the encode stage processing, an encoder 2 encodes a digital audio recording, which has a number of original audio channels or audio objects, into a different digital format. The new format may be more suitable for storage of an encoded file (e.g., on a portable data storage device, such as a compact disc or a digital video disc), or for communicating a bitstream to a consumer computer (e.g., over the Internet). The encoder 2 may also perform lossy or lossless bitrate reduction (data compression), upon the original audio channels or audio objects, e.g., in accordance with MPEG standards, or lossless data compression such as Apple Lossless Audio Codec (ALAC).

An equalization (EQ) value generator 3 produces a sequence of EQ values; these define the EQ filtering that is to be applied in the decode stage processing as shown, when decoding the encoded, digital audio recording. The EQ values may define a fixed, time-invariant, linear filtering process that can be applied to a digital audio signal (of the decoded recording), or they may define variable linear filtering, having a spectral shape that can vary as per the EQ values, for example on a per digital audio frame basis (where the digital audio signal may be processed in frames or time chunks.) The EQ filtering can be applied prior to downmix (e.g., when more than two of the decoded audio channels are then combined into stereo), after downmix, or both prior to and after downmix. The EQ filtering may also be specified as being applicable only to a pre-defined group of one or more of the decoded, audio channels or audio objects of the recording—more on this aspect will be provided below. Tables 1 and 2 below are examples showing parts of an EQ value sequence.

In one embodiment, the EQ value generator 3 includes a graphic equalizer that is operable by a human user, e.g., a mixing engineer, and configurable into a number of graphic equalizer settings. The original audio channels are input to the graphic equalizer, wherein the graphic equalizer is to then filter at least a portion of the digital audio recording in accordance with a particular graphic equalizer setting. These filtered audio signals may then be sent to a playback system (having an audio power amplifier and speaker system—not shown), so as to enable the user to evaluate the sound of the particular graphic equalizer setting (for a given portion or segment of a given group of audio channels or objects.) The EQ value generator 3 may have a digital filter synthesizer that produces the EQ instructions or values, for a given input recording. Different channels or objects (as assigned to a given group) of the piece of sound program content can be assigned their respective EQ sequence of EQ values.

In one embodiment, the EQ instructions or values of an EQ sequence define a linear, digital filter that has a desired transfer function (based on what is found to be a desirable graphic equalizer setting for the given input recording.) This is also referred to as time domain spectral shaping or linear filtering. In another embodiment, the linear filtering is defined in the frequency domain using equalizer gain levels, one per frequency band, for a number of frequency bands, which define sub-band domain filtering to be applied to an indicated EQ group (of one or more of the original audio channels or audio objects.)

The encode stage processing may also have a bitstream multiplexer 4 that combines the encoded digital audio recording with one or more sequences of EQ values (produced by the EQ value generator 4), the latter as metadata associated with the encoded digital audio recording. The result of the combination may be a bitstream or encoded file (generically referred to from now on as "a bitsream 6") that contains the encoded recording and its associated metadata. It should be noted that the metadata may be embedded with the encoded recording in the bitstream 6, or it may be provided in a separate file or a side channel (with which the encoded recording is associated.)

Still referring to FIG. 1, the decode stage processing may have the following components, all of which may for example be implemented as a programmed processor of a computer, e.g., a consumer electronic device such as a laptop computer, a smartphone, or tablet computer. The bitstream 6 is received by a bitstream demultiplexer 8, for example by reading from a locally connected device (e.g., a CD or DVD drive, a smartphone) or streaming from a remote media server over the Internet. The bitstream 6 contains a) the encoded digital audio recording, combined with b) a sequence of EQ values as part of the metadata, which is associated with the encoded digital audio recording. The EQ sequence identifies an EQ group, which is a group of one or more of the original audio channels or audio objects, upon which EQ filtering is to be applied; the EQ group may have been defined using the EQ value generator 3 in the encoding stage, e.g., by for example the mixing engineer selecting certain channels or objects to be in a single group.

The demultiplexer 8 may have the inverse capability of the multiplexer 4, and is able to extract the encoded audio or sound program content and provide it to a decoder 9. The latter may have the inverse capability of the encoder 2, and thus decodes the original audio channels or audio objects, from the encoded audio recording. The demultiplexer 8 is also able to extract the sequence of EQ values (including the associated EQ group definitions), from the metadata. This information is passed to an EQ grouper 10 and configures two or more EQ filters 11_1, 11_2, . . . 11_K, assigned to K groups, respectively. A group here refers to one or more audio channels or audio objects; there may be a separate sequence of EQ values provided for each group, as shown. The EQ values assigned to a given group define the EQ filter 11 that will operate upon each channel or object in that group (of decoded audio channels or objects.) In one embodiment, when the decode stage EQ filtering process has been enabled, the specified groups are filtered (in accordance with the EQ values specified in the metadata for each group), independently of whether or not a downmix processor 16 is also enabled.

Still referring FIG. 1, a downmix processor 16 may optionally be enabled in the decode stage, to combine for example three or more (P>2) input, EQ filtered channels or objects, into two or more (Q<P) output channels (e.g., converting 5.1 surround into two channel stereo) in accordance with a downmix grouping definition that is also extracted from the metadata. The output channels from the downmix processor 16 are then converted into sound by a rendering system (e.g., the audio power amplifiers and speakers of a consumer electronic device—not shown.) In one embodiment, the EQ filtering specified in the metadata is to be performed regardless of whether or not the downmix processor 16 is present. When the metadata specifies a downmix process, it can also include pre-downmix EQ values for applying EQ (in the decoding stage) prior to the downmix operation, and also post-downmix EQ values for applying EQ after to the downmix operation. An example is given below, in connection with FIG. 2.

Another optional feature in the decode stage processing is the application of DRC to a selection from the EQ filtered channels or objects, prior to downmix. For this purpose, a number of DRC blocks 14_1, 14_2, . . . 14_L can be provided; each DRC block 14_i performs dynamic range compression on the one or more channels or objects that are assigned to its group; there may be up to L groups (of one or more channels or objects each). This grouping of the decoded channels or objects (upon which DRC is to be applied) is performed by a DRC grouper 13 that is configured in accordance with the DRC group definitions that are contained in the metadata (in addition to the EQ metadata described above.) The metadata thus identifies a DRC group (of channels or objects) and a respective set of DRC settings (DRC sequence), such as threshold and ratio values that define a desired compression curve that can vary over time during playback, to be applied to the channels of that group. The same DRC sequence is thus to be applied to all of the channels or objects in a given DRC group. The metadata can specify a grouping for DRC that is independent of a grouping for EQ.

Figure 2:
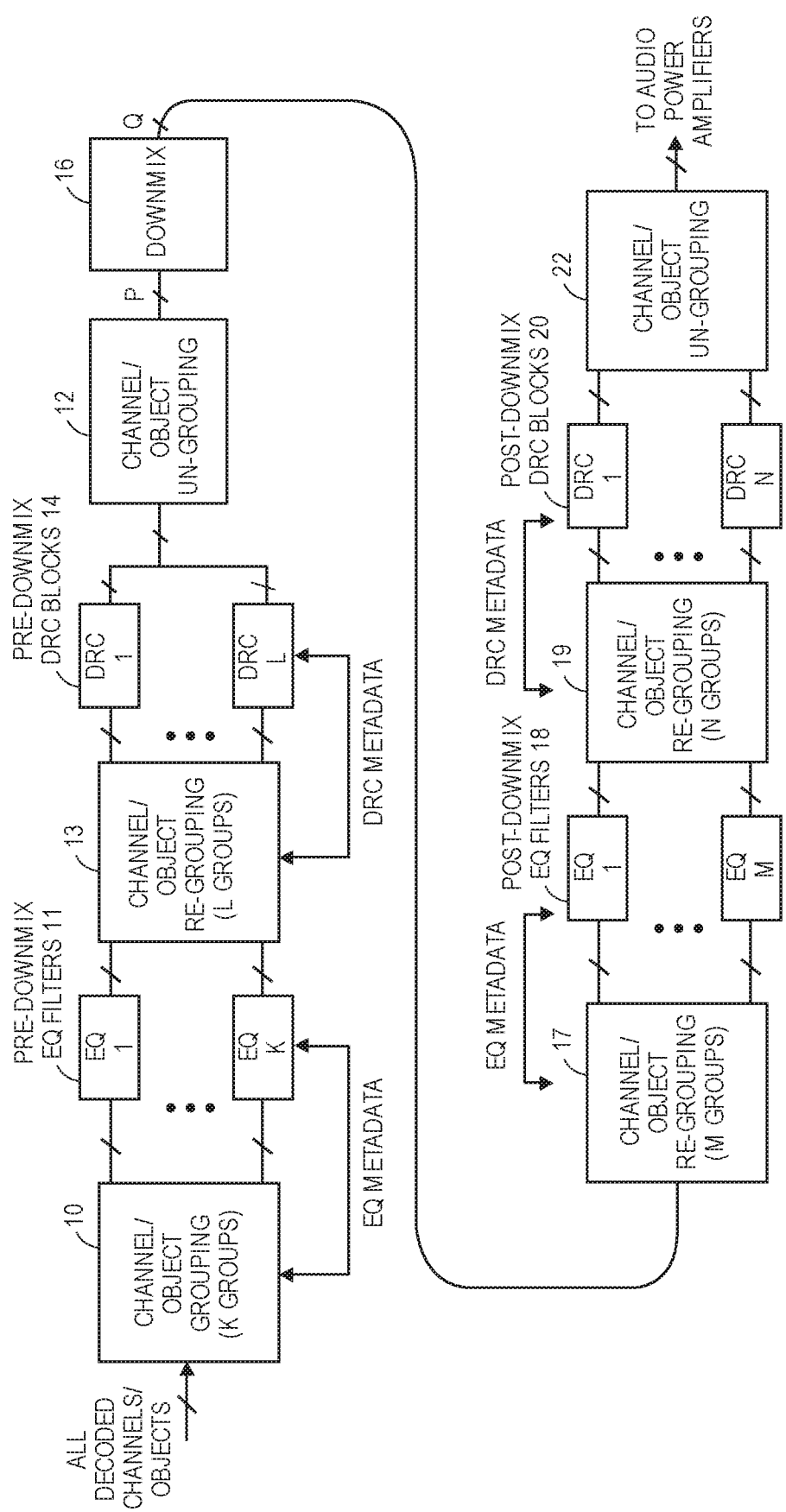
FIG. 2 illustrates an example of decode stage processing that has EQ, DRC and downmix capability.

FIG. 2 illustrates a more comprehensive example of decode stage processing that has EQ, DRC and downmix capability. All decoded channels or objects are made available to an EQ grouper 10. The extracted metadata specifies grouping of these decoded channels or objects into a number of groups, for purposes of applying equalization to them during playback. This grouping means that a given EQ value sequence in the metadata is to be applied to all of the channels or objects in an associated EQ group, say group 3, by configuring a pre-downmix EQ filter 11_3. In other words, the EQ group definitions are provided by the bitstream demultiplexer 8 (see FIG. 2) to the EQ grouper 10; the latter in response groups the decoded channels or objects into the specified two or more (K) groups. Each of these K groups is then filtered by a respective, pre-downmix EQ filter 11 that has been configured as defined in the EQ value sequence associated with the group. An example of the basic structure of the EQ filter 11 is given below in FIG. 3.

In one embodiment, the metadata can specify more than one "EQ set". An EQ set contains instructions for or defines a grouping of the original audio channels or objects, and the EQ filtering that is to be applied to those grouped channels or objects. In other words, each EQ set is associated with a respective grouping of the original audio channels or objects, and the EQ filtering defined therein may be applied during a different playback scenario. For example, there may be one EQ set that is intended for playback of the decoded audio recording through loudspeakers in a large room, another EQ set that is intended for playback of the recording in a small room, while another EQ set may be intended for playback of the decoded audio recording through a headset.

Still referring to FIG. 2, if the metadata also contains DRC group definitions and DRC settings (per DRC group), then a decision may be made in the encode stage processing to provide a DRC grouper 13 with the DRC group definitions from the metadata, and also configure L pre-downmix DRC blocks 14 in accordance with the DRC settings from the metadata. Once the decoded audio channels or objects have been filtered by the pre-downmix EQ filters, they may be re-grouped and then dynamic range compressed by the pre-downmix DRC blocks 14, before being un-grouped by a channel/object un-grouper 12 and then provided as input to the downmix processor 16.

As pointed out above, the metadata may also contain the needed EQ sequences and EQ grouping definitions to perform post-downmix, linear spectral shaping (equalization, or EQ filtering) upon the decoded audio recording. In that case, a channel/object re-grouper 17 may be provided in the decode stage that re-groups the output audio channels or objects of the downmix processor 16, into M groups (as specified in the metadata). Also, M downmix EQ filters 18 are configured (in accordance with their respective EQ sequences). The re-grouped audio channels or objects then pass through the downmix EQ filters 18. As a further aspect, a post-downmix DRC operation may also be specified in the metadata; it can be implemented by a channel/object re-grouper 19 that re-groups the channels or objects at the outputs of the post-down mix EQ filters 18, in accordance with a post downmix EQ grouping definition contained in the metadata, and by the post-downmix DRC blocks 20 which are configured as specified by post downmix EQ sequences in the metadata, to compress the post-downmix, EQ filtered audio channels or objects. Finally, a channel/object un-grouper 22 re-shuffles the output signals from the post-downmix DRC blocks 20 into the arrangement needed to drive a number of audio power amplifiers that are in the playback system.

The above described approach for using the metadata to deliver EQ instructions to the decode stage is particularly effective when distributing or producing feature films (motion picture films.) Typically, a theatrical master of the audio-visual work is first generated having a sound track that is optimized for playback in a large room such as a public movie theater. In particular, the theatrical master audio or sound track has a large dynamic range. A home mix (e.g., for a DVD release) is then created, by applying equalization to the sound track based on a typical X-curve (target level versus frequency) that is selected for a smaller room, to modify the sound track so that treble and bass are attenuated while midrange remains flat. Also, the theatrical master is modified for the home mix to have less dynamic range) that is selected for a smaller room. Thus, the signal processing that is applied to the theatrical mix of the audio soundtrack to generate the home mix typically includes dynamic range compression (DRC) as well as equalization (EQ).

In accordance with an embodiment of the invention, with a goal of generating a home mix from the theatrical mix at the playback side (decode stage), information is embedded within the metadata of the audio soundtrack of a feature film that describes the needed operations for performing dynamic range compression and linear equalization filtering, to be executed in a playback device. An advantage of this approach is that it enables a unified distribution format, which contains a single base version of the sound track, and is therefore bitrate efficient, but is also able to deliver multiple, different rendered versions of the sound track for different playback scenarios.

The equalization that is to be applied to the soundtrack should take into account the specific configuration of the speakers in the playback environment, in order to achieve improved tonal balance. Rather than adopting a fixed equalization curve depending on a particular speaker layout, the metadata may include EQ sequences that can vary from one instance to another, of the delivery of a feature film. For example, the EQ sequences can be tailored by the producer or distributor of a motion picture film, to be specific to a particular speaker layout in the living room of a consumer. The EQ sequences can also be tailored to the particular content or sound events in the sound track.

The approaches described above are also applicable to object-based audio (where the sound track or audio recording includes either audio channels and/or audio objects). Object-based audio provides flexibility in composing the acoustic scene, by enabling the location of a rendered audio object to be controlled. To achieve improved tonal balance, the equalization filtering that is applied to each audio object should depend on its rendering location, for example which speaker is going to be converting the audio object. The EQ sequences that are specified in the metadata can thus be selected with this object-based audio characteristic in mind. Multiple EQ sets, of EQ sequences, can be included in the metadata, to enable the delivery of different mixes or renderings, again based on the same, base audio object. Sets of EQ sequences may for example be defined for playback at different virtual locations of the listener (e.g. one set of EQ sequences may be designed for when the virtual listener is assumed to be a member of the audience and sitting "in front" of a stage on which a musical band is playing, while another EQ sequence may be designed for a rendering where the virtual listener is on stage).

An embodiment of the invention is an approach to provide consistent equalization as controlled by the producer or distributor of an audio recording (e.g. as part of a feature film), where the "audio scene" can be rendered differently than an unmodified scene of an encoded, base version of the audio recording, using equalization applied to the decoded base version, to improve the audio quality for a modified audio scene, as specified in the metadata. Examples of where this particular solution is beneficial include the case where the encoded audio recording (e.g. the theatrical master) has surround content, but is to be reproduced in the playback device by a stereo loudspeaker system. In other instances, the equalization techniques described above are also useful where the playback scene does not have height speakers that would enable it to reproduce the sound from an elevated source.

As seen in the comprehensive example of FIG. 2 introduced above, one embodiment of the system provides the option to apply linear spectral shaping filtering (EQ) at several stages within the decoder processing or decoder stage including both prior to down mix and post down mix as depicted. If the metadata specifies that both EQ and DRC are to be applied, upon the decoded audio recording, then the EQ is applied before application of DRC. This is also depicted in FIG. 2, where the pre-down mix EQ filters 11 process (spectrally shape) the decoded audio channels or objects prior to these signals being re-grouped (by the re-grouper 13) and then processed by the pre-down mix DRC blocks 14 (and similarly in the post-down mix stage, where the EQ filters 18 process the decoded audio channels or objects prior to them being compressed by the post-down mix DRC blocks 20). Note that as mentioned above, the grouping of the audio channels or objects for the purpose applying EQ to them may be independent of the grouping (specified in the metadata) for the application of dynamic range compression.

Figure 3:
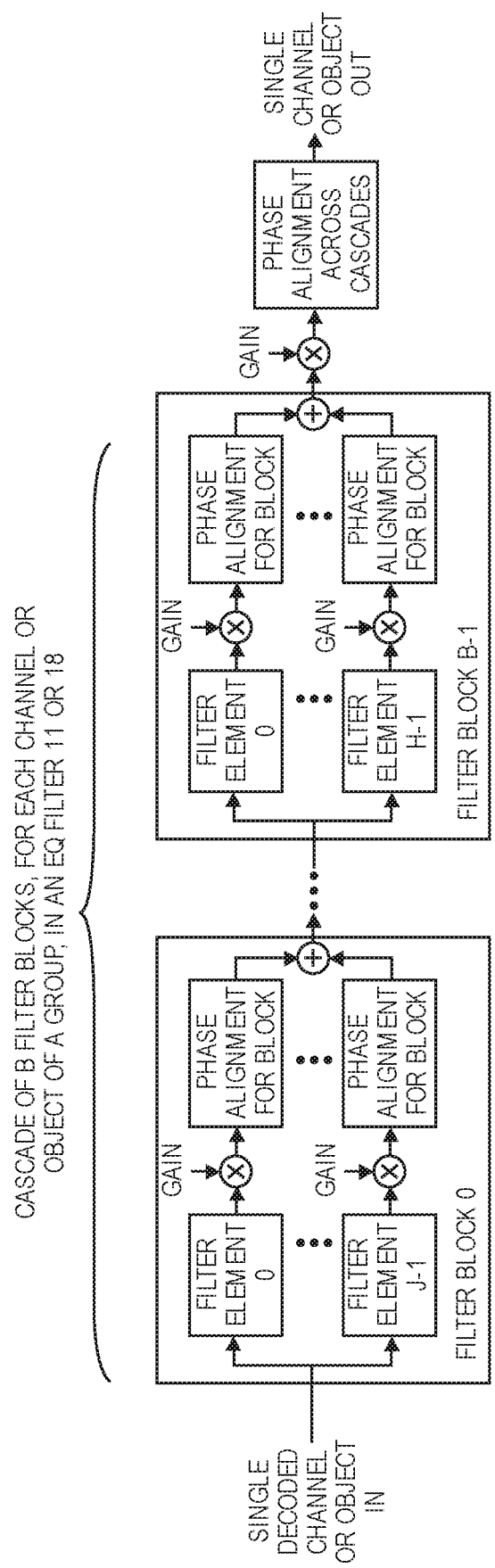
FIG. 3 is an example digital filter cascade structure of an EQ filter block.

Various approaches for defining the EQ filters 11, 18 can be taken, also referred to as a parameterization of each EQ filter, in an EQ value sequence (within the metadata.) For example, the structure of a digital filter can be specified in the metadata, in addition to the parameters that define the frequency response of the filter. For example, each filter 11, 18 may be composed of individual filter elements including for example finite impulse response, FIR, and/or infinite impulse response, IIR, that may be connected in parallel to form a filter block, and then several of such filter blocks are cascaded. An example of such a structure is depicted in FIG. 3, which shows a cascade of B (two or more) filter blocks that are in an EQ filter 11 or 18. This is also referred to as a digital filter cascade, which is formed by cascading the filter blocks 0, 1, ... B–1. Each filter block has two or more FIR elements, IIR elements, or a combination both, that are connected in parallel as shown, so that each filter element receives the same, single, decoded channel or object as input. In this case, there are J filter elements, corresponding to J frequency bands of the audio spectrum that are desired to be spectrally shaped. The arrangement depicted in FIG. 3 may be duplicated for each single, decoded channel or object, of a given group. In one embodiment, each filter cascade as depicted in FIG. 3 has the same configuration (as defined for a particular EQ group), and is duplicated for each decoded channel or object that is contained within the EQ group. The set of filter elements (here, filter cascades) for all of the channels or objects is referred to here as an EQ filter set, where as suggested above the metadata may specify more than one EQ filter set where each of these is designed or intended for a different playback scenario (of the same base audio recording).

All of the channels or objects in a given EQ group are to be passed in parallel through a filter structure that has a separate instance of the same, linear filter cascade (as depicted in FIG. 3 for example) for each channel or object in the given group. In other words, all of the channels or objects in a given EQ group are filtered in the same way. The configuration or definition of the filter elements within the cascade are specified in the metadata, by an EQ value sequence that defines the filtering to be applied to a particular EQ group.

The metadata may specify that only IIR filters are to be used in the filter cascade, or it may specify a combination of IIR and FIR filters. The definition of the filter cascade may include the poles and zeroes of each filter block, which are to be constructed or synthesized in the decode stage for time domain filtering of the indicated EQ group of one or more of the decoded, original audio channels or audio objects. The pole and zero locations may be in the z-plane (radius and angle) and may be deemed to be IIR filter parameters. Alternatively, an EQ sequence may define the filter cascade by specifying the digital filter coefficients of the filter elements, also for time domain filtering of the indicated EQ group of one or more of the original audio channels or audio objects. Still referring to FIG. 3, at the output of each of the filter elements that are in parallel with each other (and that make up a filter block), a respective, scalar gain may be applied, before the outputs are combined into a single input signal for the next block of the filter cascade, as shown.

The metadata may also specify whether or not a phase alignment filter is needed, to obtain a phase match between the outputs of all of the parallel-connected filter elements within a filter block (that are processing the same input channel or object in parallel), before the outputs are combined into the single input signal for the next block of the same filter cascade. In FIG. 3, such phase alignment filters are labeled, "Phase Alignment for Block" and are applied to the output of each filter element (as needed) within a given filter block. The phase alignment is designed to help avoid undesired phase effects when combining the outputs of several filter elements (in several frequency bins), within the same filter block. The phase alignment filters may be defined (in the metadata) as being all pass filters whose phase responses have been designed to obtain a phase match across all of their outputs.

As shown in FIG. 3, phase alignment may also be performed as between different channels or objects. In other words, such phase alignment is to be performed between an EQ filtered channel or object of one EQ group, and the EQ filtered channel or object of another EQ group. This is to avoid undesired effects when combining different channel groups (for example by the down mix processor 16), or when converting the EQ filtered channels or objects into sound. In FIG. 3, such a phase alignment filter is indicated as "Phase Alignment Across Cascades" and is applied to the output of the last filter block (filter block B–1) of a cascade, so that for example the output channels or objects from EQ filter 11_1 are phase matched with those of EQ filter 11_2. More specifically, this should be done to obtain a phase match across all of the EQ filtered channel groups (here, the output channels or objects from EQ filters 11_1, 11_2, ... 11_K are all phase matched.) It should be noted that a phase alignment filter might not exist in some cases. As such, in one embodiment, the metadata specifies only those IIR filters, for an EQ filter set, for which a phase-alignment filter exists (and is also specified in the metadata.) A phase alignment filter may be synthesized (in the decode stage) as a time domain digital filter.

The following table is an example definition of part of an EQ sequence (in the metatada), showing example encoding and descriptions of the EQ values.

| Field | Encoding | Description |
|---|---|---|
| eqSetId | Index [0, 63] | Identifier for the EQ set defined in eqInstructions( ). Value 0 is reserved. |
| downmixIdPresent | Flag [0, 1] | If 1, DownmixId is present |
| downmixId, additionalDownmixId | Index [0, 127] | Identifies a downmix that can be applied in combination with this EQ. The EQ is applied after the downmix. A value of 0 refers to the base layout, hence the EQ is applied to the base layout. |
| additionalDownmixIdPresent | Flag [0, 1] | If 1, additional DownmixIds are present |
| additionalDownmixIdCount | Count [0, 127] | Number of additional Downmix IDs |
| drcSetId, additionalDrcSetId | Index [0, 63] | Indentifies a DRC set that can be applied in combination with this EQ. A value of 0 indicates that it is permitted to apply the EQ without DRC. |
| additionalDrcSetIdPresent | Flag [0, 1] | If 1, additional DrcSetIds are present |
| additionalDownmixIdCount | Count [0, 63] | Number of additional DRC set IDs |
| effectSetsPresent | Flag, must be 0 | Indicates if effects should be applied |
| effectSet1Id, effectSet2Id, effectSet3Id, | Index [0, 63] | Index refers to specific effect set (for future use) |
| eqSetPurpose | Bit field, see Table A.44 | Defines the purpose of the EQ |
| dependsOnEqSetPresent | Flag [0, 1] | If 1, the EQ set shall be applied in combination with a second EQ set. The second EQ set must be located at the opposite side of the downmixer |
| dependsOnEqSet | Index [0, 63] | Index of the EQ set that shall be combined with this EQ set |
| noIndependentEqUse | Flag [0, 1] | If 1, the EQ set can only be used in combination with a second EQ set |
| eqChannelGroup | Index [1, 127] | Index of EQ channel group that the channel belongs to |
| tdFilterCascadePresent | Flag [0, 1] | Indicates if a time-domain filter cascade is defined |
| eqCascadeGainPresent | Flag [0, 1] | Indicates if a filter cascade gain value is present |
| bsEqCascadeGain | Gain value, see Table A.47 | Filter cascade gain value |
| filterBlockCount | Count [0, 15] | Number of filter blocks contained in this cascade |
| filterBlockIndex | Index [0, 127] | Index refers to definition of filter block in eqCoefficients( ) |
| eqPhaseAlignmentPresent | Flag [0, 1] | If 1, indicates that phase alignment information is present |
| bsEqPhaseAlignment | Flag [0, 1] | If 1, indicates that the corresponding EQ channel groups are phase aligned |
| subbandGainsPresent | Flag [0, 1] | If 1, indicates that gain values for sub-band gains are present |
| subbandGainsIndex | Index [0, 63] | Index refers to sub-band gain vector in eqCoefficients( ) |
| eqTransitionDurationPresent | Flag [0, 1] | If 1, indicates that a transition duration value is present |
| eqTransitionDuration | Time value, see Table A.49 | Transition duration for crossfading from the output of the previous EQ set to the current EQ set |

| Bit position | EQ purpose | Description (valid if bit is set) |
|---|---|---|
| 1 (LSB) | Default EQ | For generic use |
| 2 | Large room | For playback in rooms with the volume significantly larger than a typical living room. |
| 3 | Small space | For playback in rooms with the volume significantly smaller than a typical living room. |
| 4 | Average room | For playback in rooms with a volume of a typical living room. |
| 5 | Car cabin | For playback in a passenger car. |
| 6 | Headphones | For playback with headphones. |
| 7 | Late night | For playback with reduced exposure for others nearby, such as someone in an adjacent room, to minimize potential disturbance. |
| Remaining bits reserved | reserved | |

As explained above, an EQ sequence contains EQ values, which define the spectral shaping (EQ filtering) that is to be applied to the decoded audio channels or objects of the specified EQ group (the decoded EQ group). In one embodiment, this encoding stage or production-side defined EQ filtering is applied by the decode stage processor to reduce gain of the decoded, original audio channels or objects below 500 Hz, whether or not downmix is also specified in the metadata (and applied to the decoded EQ group.) For example, the decode stage processor may interpret the EQ sequence as being associated with a special, "late night" mode of operation for the playback device. This mode of operation may be enabled, for example manually by a user of the playback device or set to be enabled automatically during late evening (based on the current time of day), so as to reduce the chance of low frequency rumble disturbing others who may be resting in adjacent rooms during playback. If the special mode is enabled, then the decode stage processor applies the EQ filtering as defined by the EQ sequence, regardless of the presence of the downmix processor 16. This enables the production-side of the audio recording to determine how much to drop the gain in a low frequency band, by also considering the content of the audio recording so as not to drop the gain too much, thereby providing a better user experience regardless of whether or not any downmix is performed for the playback.

In another embodiment, the metadata further specifies loudness information for an EQ filtered version of the EQ group of one or more of the original audio channels or audio objects, where this loudness information may have been estimated in the encoding stage.

It is to also be understood that the embodiments described above are merely illustrative of and not restrictive on the broad invention, and that the invention is not limited to the specific constructions and arrangements shown and described, since various other modifications may occur to those of ordinary skill in the art. For example, although each of the encoding and decoding stages may be described in one embodiment as operating separately, for example the encoding stage in an audio content producer machine and the decoding stage in an audio content consumer machine, where these may be communicating with each other over the Internet, the encoding and decoding could also be performed within the same machine (e.g., part of a transcoding process). Thus, the description should be regarded as being illustrative, not limiting.

What is claimed is:

1. A system for producing an encoded digital audio recording having a plurality of audio channels or audio objects, comprising:
   an encoder to encode a digital audio recording having a plurality of original audio channels or audio objects, to produce an encoded digital audio recording;
   an equalization (EQ) value generator to produce a sequence of EQ values which define EQ filtering that is to be applied to a specified EQ group of one or more of the original audio channels or audio objects, independent of downmix and upon decoding the encoded digital audio recording, wherein the EQ filtering is linear spectral shaping that is defined by a setting of a graphic equalizer and is to be applied to the audio channels or audio objects of the specified EQ group; and
   a bitstream multiplexer to combine a) the encoded digital audio recording with b) the sequence of EQ values including an indication of said EQ group, the latter as metadata associated with the encoded digital audio recording.

2. The system of claim 1 wherein the sequence of EQ values defines the EQ filtering that is to be applied upon decoding of the EQ group, as reducing gain below 500 Hz whether or not downmix is applied to the decoded EQ group.

3. The system of claim 1 wherein the sequence of EQ values defines the EQ filtering that is to be applied upon decoding of the EQ group, as a late night mode that can be enabled during playback, of the decoded digital audio recording, either automatically by a decoder or manually by a user.

4. The system of claim 1 wherein the EQ values comprise equalizer gain levels, one per frequency band for a plurality of frequency bands, for sub-band domain filtering of the EQ group of one or more of the original audio channels or audio objects.

5. The system of claim 1 wherein the EQ value generator comprises:
   a graphic equalizer that is operable by a human user and configurable into a plurality of graphic equalizer settings; and
   a digital filter synthesizer that produces the EQ values based on a particular graphic equalizer setting.

6. The system of claim 1 wherein the metadata is to specify a downmix, pre-downmix EQ values for applying EQ at a decoding stage prior to a downmix operation at the decoding stage, and post-downmix EQ values.

7. The system of claim 1 wherein the metadata associated with the encoded digital audio recording is to be carried in a plurality of extension fields of MPEG-D Dynamic Range Control, DRC.

8. The system of claim 1 wherein the metadata is to specify a plurality of different EQ sequences,
   wherein each of the EQ sequences is associated with a respective, specified grouping of the one or more of the original audio channels or audio objects upon which EQ filtering as defined by the sequence is to be applied independent of downmix and upon decoding the encoded digital audio recording,
   wherein each of the EQ sequences and its respective, specified grouping of the original audio channels or audio objects is for a different playback scenario.

9. The system of claim 1 wherein the metadata is to further specify loudness information for an EQ filtered version of the EQ group of one or more of the original audio channels or audio objects.

10. The system of claim 1 wherein the sequence of EQ values represents time varying equalization filtering which is to be applied to the EQ group of one or more of the original audio channels or audio objects, independent of downmix and upon decoding the encoded digital audio recording, wherein the time varying equalization filtering changes during playback of the decoded audio recording.

11. A method for producing an encoded digital audio recording having a plurality of audio channels or audio objects, comprising:
   encoding a digital audio recording having a plurality of original audio channels or audio objects, to produce an encoded digital audio recording;
   producing a sequence of equalization, EQ, values which define EQ filtering that is to be applied to a specified EQ group of one or more of the original audio channels or audio objects, independent of downmix and upon decoding the encoded digital audio recording, wherein the EQ filtering is linear spectral shaping that is defined by a setting of a graphic equalizer and is to be applied to the audio channels or audio objects of the specified EQ group; and
   combining into a bitstream a) the encoded digital audio recording with b) the sequence of EQ values including an indication of said EQ group, the latter as metadata associated with the encoded digital audio recording.

12. The method of claim 11 wherein the sequence of EQ values defines the EQ filtering that is to be applied to the EQ group upon decoding the encoded digital audio recording, as reducing gain below 500 Hz whether or not downmix is applied to the EQ group.

13. The method of claim 12 wherein the sequence of EQ values defines the EQ filtering that is to be applied upon decoding the encoded digital audio recording, as a late night mode that can be enabled during playback, of the decoded digital audio recording, either automatically upon decoding the EQ group, or manually by a user.

14. The method of claim 11 wherein the metadata specifies grouping of the plurality of original audio channels or audio objects into a plurality of groups for EQ, wherein the same EQ sequence is to be applied to all of the original audio channels or audio objects in a given EQ group.

15. A method for producing a filtered, decoded digital audio recording, the method comprising:
   receiving a bitstream that includes a) an encoded digital audio recording having a plurality of audio channels or audio objects, and b) metadata associated with the encoded digital audio recording that includes a sequence of equalization, EQ, values which define EQ filtering that is to be applied to a specified EQ group of one or more of the original audio channels or audio objects, independent of downmix and upon decoding the encoded digital audio recording, wherein the sequence of EQ values further includes an indication of said EQ group;

decoding the encoded digital audio recording to produce a decoded digital audio recording; and applying the EQ filtering to the specified EQ group of the decoded digital audio recording, wherein the EQ filtering is linear spectral shaping defined by a setting of a graphic equalizer and is applied to the audio channels or audio objects of the specified EQ group in only forward paths of the audio channels or audio objects of the specified EQ group.

16. The method of claim 15 wherein the sequence of EQ values defines the EQ filtering that is applied to the specified EQ group, as reducing gain below 500 Hz whether or not downmix is applied to the EQ group.

17. The method of claim 16 wherein the sequence of EQ values defines the specified EQ filtering that is applied, as a late night mode that can be enabled during playback, of the decoded digital audio recording, either automatically upon decoding the EQ group or manually by a user.

18. The method of claim 15 wherein the sequence of EQ values defines the specified EQ filtering that is applied, as a late night mode that can be enabled during playback, of the decoded digital audio recording, either automatically upon decoding the EQ group, or manually by a user.

19. The method of claim 15 wherein the metadata specifies grouping of the plurality of original audio channels or audio objects into a plurality of groups for EQ, wherein the same EQ sequence is applied to EQ filter all of the original audio channels or audio objects in a given EQ group.

20. The method of claim 19 wherein the metadata further comprises a dynamic range control, DRC, sequence and specifies grouping of the plurality of original audio channels or audio objects into a plurality of DRC groups for a decoder side process to apply dynamic range control in accordance with the DRC sequence, to the audio channels or objects in each DRC group, and wherein the specified grouping for DRC is independent of the specified EQ group, the method further comprising applying DRC in which the same DRC sequence is applied to change dynamic range of all of the original audio channels or audio objects in a given one of the plurality of DRC group.

21. An audio decoding side system comprising:

a processor; and memory having stored therein instructions for processing a digital audio recording, wherein the processor upon executing the instructions receives a bitstream that includes a) an encoded digital audio recording having a plurality of audio channels or audio objects, and b) metadata associated with the encoded digital audio recording that includes a sequence of equalization, EQ values which define EQ filtering that is to be applied to a specified EQ group of one or more of the original audio channels or audio objects, independent of downmix and upon decoding the encoded digital audio recording, wherein the sequence of EQ values further includes an indication of said EQ group, decodes the encoded digital audio recording to produce a decoded digital audio recording, and applies the EQ filtering to the specified EQ group of the decoded digital audio recording, wherein the EQ filtering is linear spectral shaping defined by a setting of a graphic equalizer and is applied to the audio channels or audio objects of the specified EQ group in only forward paths of the audio channels or audio objects of the specified EQ group.

22. The system of claim 21 wherein the sequence of EQ values defines the EQ filtering that is applied to the specified EQ group, as reducing gain below 500 Hz whether or not downmix is applied to the EQ group.

23. The system d of claim 21 wherein the metadata specifies grouping of the plurality of original audio channels or audio objects into a plurality of groups for EQ, wherein the same EQ sequence is to be applied to all of the original audio channels or audio objects in a given EQ group.

* * * * *